Nov. 2, 1926.   1,605,424
A. V. BOOTHROYD
SPRING SUSPENSION FOR MOTOR AND OTHER VEHICLES
Filed Oct. 26, 1925   3 Sheets-Sheet 1
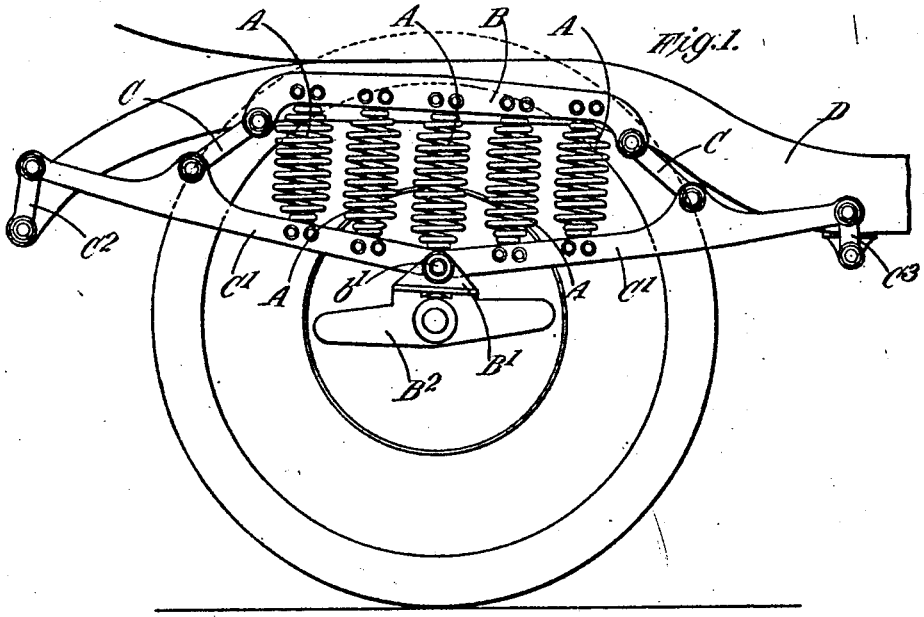
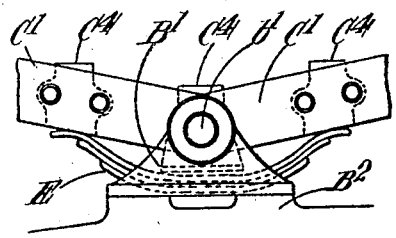
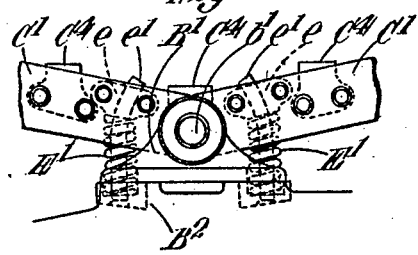
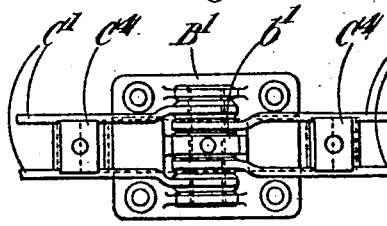
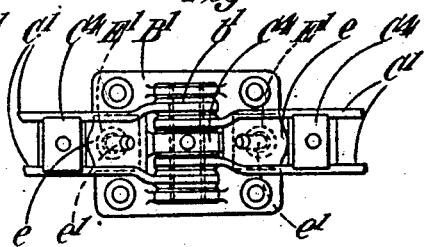

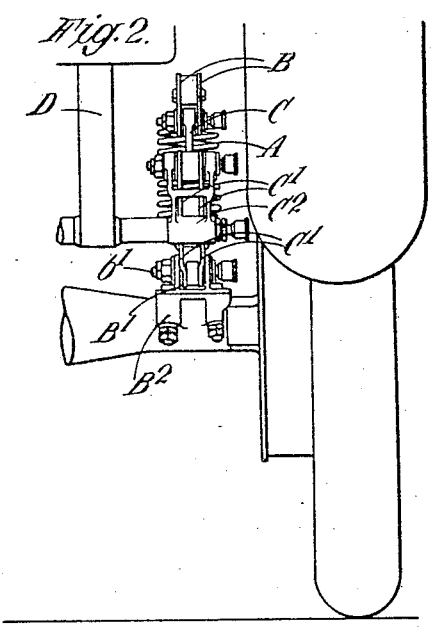
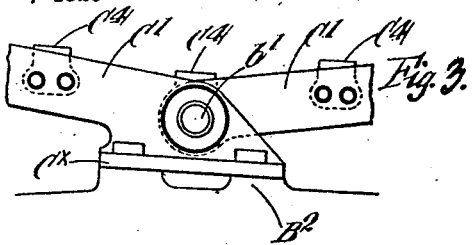
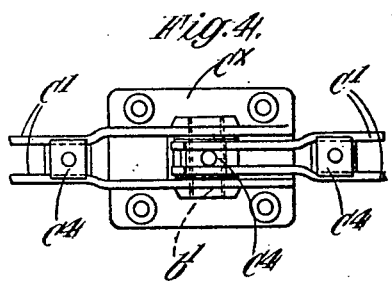
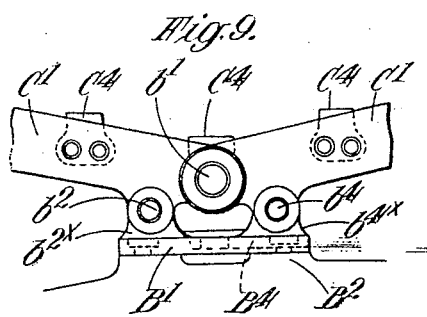
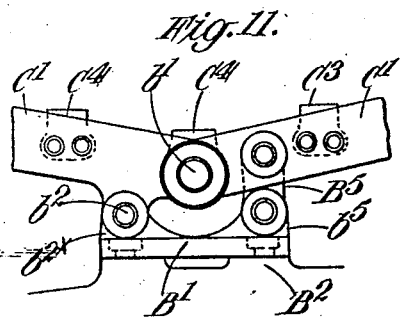
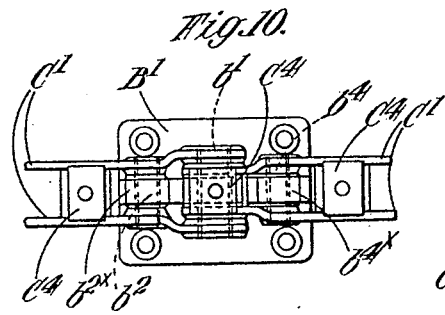
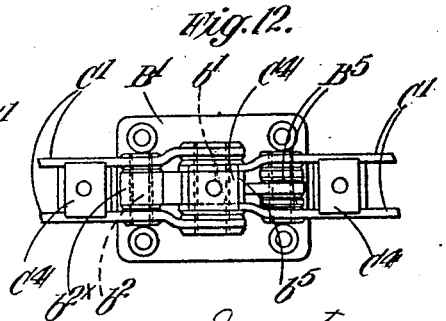

Nov. 2, 1926.  
A. V. BOOTHROYD  
1,605,424
SPRING SUSPENSION FOR MOTOR AND OTHER VEHICLES
Filed Oct. 26, 1925   3 Sheets-Sheet 3
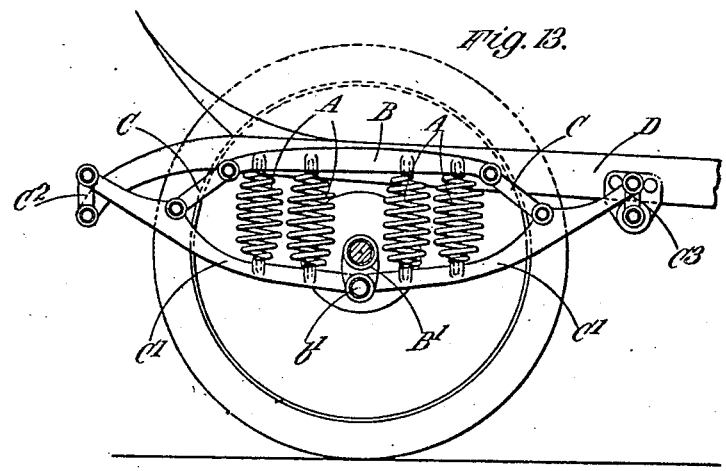
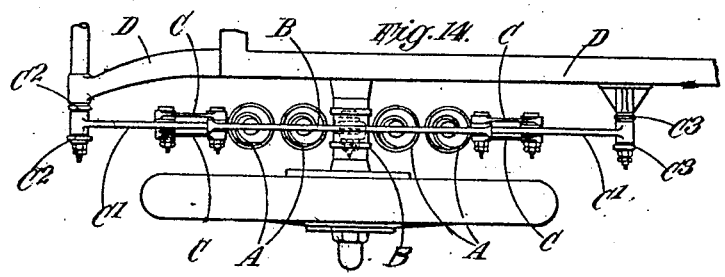

Patented Nov. 2, 1926.                                                                1,605,424

UNITED STATES PATENT OFFICE.

ALBERT VINCENT BOOTHROYD, OF DARLINGTON, ENGLAND, ASSIGNOR TO THOMAS SUMMERSON & SONS LIMITED, OF DARLINGTON, ENGLAND, A BRITISH COMPANY.

SPRING SUSPENSION FOR MOTOR AND OTHER VEHICLES.

Application filed October 26, 1925, Serial No. 65,005, and in Great Britain October 25, 1924.

This invention relates to an improvement in or modification of the spring suspension for motor and other vehicles as claimed in the specification of our British Patent No. 219,071 and has for its chief object to provide a simplified construction of spring suspension which is capable of ready assembly and is easily accessible, thus rendering it particularly useful for road vehicles.

According to the present invention the collapsible frame described in the specification of the aforesaid patent is modified by dispensing with the lower bearer and interposing the springs between the upper bearer and suitably arranged lower links, formed of single or double members, which are connected at their outer ends to the vehicle frame and are connected at points between their ends to the upper bearer by means of upper links. The modified collapsible frame is thus composed of five main elements, viz., the upper bearer, the two lower links, and the two upper links. The said lower links are preferably made of resilient metal so as to limit and control the lateral movements of the vehicle frame relatively to the axle.

The attachment of the collapsible frame to a non-rotary vehicle axle or to the spring seat in the case of a live axle where a torque tube or torque rods are provided, may be effected by means of a bracket carrying a pivot pin engaging with the inner ends of the lower links; in this case the attachment to the vehicle frame is effected by means of swinging links at the outer ends of the lower links. Where the torque reaction is taken by the spring suspension, the forward lower link may be directly pivoted at its outer end to the vehicle frame or a part attached thereto, and acts as a radius rod in addition to performing its function as a part of the suspension device. The spring seat bracket may be replaced by a footstep formed integral with one or the other of the lower links so as to take the torque reaction. Other means which may be employed for this purpose are a spring seat bracket having located under its centre a short stiff laminated spring bearing against the under surfaces of the lower side links, or short stiff helical springs may be used surrounding curved guide rods which are mounted in the spring seat bracket at the front and rear of the central pivot and engage with guide blocks rigidly attached to the lower links; in both these cases a resilient abutment is thus provided for taking the torque reaction and allowing rotational movement of the axle casing within the limits of the short springs. The spring seat and the axle may alternatively be mechanically maintained in a position perpendicular to the reaction of the spring suspension by employing a spring seat bracket carrying in front of or behind the centre a fixed support for a pivot pin engaging suitable lugs formed on one of the lower links, similar lugs on the other lower link being pivotally attached to a sliding block working in longitudinal guides provided in the spring seat bracket. Instead of the said sliding block a short link may be employed, the lower end of this link being pivoted to a fixed support on the spring seat bracket.

In order that the said invention may be clearly understood and readily carried into effect, the same will be more fully described with reference to the accompanying drawings, in which:—

Figures 1 and 2 are respectively a side elevation and an end elevation showing one constructional form of the invention as applied to the spring seat of the live axle of a vehicle provided with a torque tube or torque rods.

Figures 3 and 4, 5 and 6, 7 and 8, 9 and 10, 11 and 12 are side elevations and plans showing five constructions for use in cases where the torque reaction is taken by the spring suspension instead of by a torque tube or torque rods as in Figures 1 and 2.

Figures 13 and 14, are respectively a side elevation and a plan showing an alternative constructional form of the invention, as applied to the rear axle of a vehicle provided with a torque tube or torque rods for the live rear axle.

Referring to Figures 1 and 2, A, A are the helical compression springs disposed between the upper bearer B and the lower links C', C' which are connected at points between their ends to the bearer B by means of upper links C, C. The inner ends of the lower links are connected to each other and to a bracket B' on the spring seat B² of the vehicle axle by a pivot pin b' and the outer ends of the lower links are connected to the vehicle frame D by means of swinging links C², C³. The springs A are provided at their ends with spigot members fitting into sockets formed in or carried by the upper bearer and the lower links; guides for the springs are thus dispensed with. The said lower links are preferably made of highly resilient spring material so as to limit and control lateral movement of the vehicle frame relatively to the axle.

As stated above the construction according to Figures 1 and 2 is for use with the live axle of a vehicle having a torque tube or torque rods and is not suitable for use with the live axle of a vehicle in which the spring suspension is also required to perform the function of a torque tube or torque rods; in the latter case the outer end of the one of the lower links C', C' (preferably the forward one) would be pivoted directly to the frame D or a bracket thereon so that this link acts as a radius rod as well as performing its function as a part of the spring suspension, the other one of the lower links being connected to the frame D by a swinging link as above described. The constructions shown by Figures 3 to 12 are also for use in those cases in which the spring suspension performs the function of a torque tube or torque rods; in all these constructions the outer end of one of the lower links would be pivoted directly to the frame D (or a bracket thereon) and the other lower link would be connected to the frame by a swinging link. In Figures 3 and 4 one of the lower links C' is formed with a footstep C$^x$ made integral therewith and rigidly attached to the axle casing in place of the bracket B' of Figures 1 and 2. Passing through the said footstep C$^x$ and through the inner end of the other one of the inner links is the pivot pin $b'$. In Figures 5 and 6 a short laminated spring E is located between the bracket B' and the part B$^2$ with its ends bearing against the lower surfaces of the lower links C', C', so that this spring resists the tendency for the axle to rotate. This laminated spring is, in Figures 7 and 8, replaced by two short stiff helical springs E', E' one arranged in front of the pivot pin $b'$ and the other behind this pivot pin. The said helical springs are guided by curved rods $e'$, $e'$ which pass through guide blocks $e$, $e$ on the links C', C'. In Figures 9 and 10 the pivot pin $b'$ merely serves to connect the inner ends of the links C', C' together and these links are formed with lugs one of which is connected by a pivot pin $b^2$ to a lug $b^{2x}$ on the bracket B' and the other is connected by a pivot pin $b^4$ to a lug $b^{4x}$ on a block B$^4$ which is slidably mounted in longitudinal guides in the bracket B'. In the construction shown by Figures 11 and 12 the sliding block B$^4$ is replaced by one or more swinging links B$^5$ the upper ends of which are pivoted to the link C' and the lower ends are pivoted to lugs $b^5$ on the bracket B'.

In the constructions shown by Figures 1 to 12 the links C', C' are shown as being composed of double side members connected together by distance pieces C$^4$ which are formed with holes to receive the lower spigot ends of the springs A, A. The bearer B is similarly formed, the distance pieces of the side members of this bearer being also formed with holes to receive the upper spigot ends of the said springs. Alternatively the links C', C' and the bearer B may each be formed as a single member provided with bosses having holes for accommodating the spigot ends of the springs A, A, the two upper links C, C being formed of double members of lighter construction, as shown by Figures 13 and 14.

The arrangement shown in Figures 13 and 14 is for the most part similar to that shown by Figures 1 and 2, except that the attachment to the axle is by means of a hanging bracket B', which may either be a fixture on the axle casing or be rotatably mounted thereon. In this case the connecting pivot pin $b'$ is suspended below the vehicle axle, allowing greater headroom for the spring suspension gear, and permitting of the vehicle frame being disposed at a somewhat lower level.

Although in the construction illustrated by Figures 13 and 14 the lower links C', C' and the upper bearer B are each formed of a single member these parts may be composed of double side members with distance pieces in a manner similar to that shown by Figures 1 and 2.

What I claim and desire to secure by Letters Patent of the United States is:—

1. In a spring suspension for vehicles, the combination with the vehicle frame and the vehicle axle, of a collapsible frame comprising links connected at their outer ends to the vehicle frame and at their inner ends to a part moving up and down with the vehicle axle, a substantially horizontal member movable towards and away from the vehicle axle, links connecting said member to the first said links at points between their ends, and springs interposed between said member and the first said links.

2. In a spring suspension for vehicles, the combination with a vehicle frame and the vehicle axle, of a collapsible frame comprising lower links pivoted at their inner ends to a part moving up and down with the vehicle axle, swinging links connecting the outer ends of said lower links to the vehicle frame, a substantially horizontal member movable towards and away from the vehicle axle, upper links connecting said member to the lower links at points between the ends of the latter links, and springs interposed between said member and said lower links.

3. In a spring suspension for vehicles, the combination with the vehicle frame and the vehicle axle, of a collapsible frame comprising laterally resilient lower links pivoted at their inner ends to a part moving up and down with the vehicle axle, swinging links connecting the outer ends of said lower links to the vehicle frame, a substantially horizontal member movable towards and away from the vehicle axle, upper links connecting said member to the lower links at points between the ends of the latter links, and springs interposed between said member and said lower links.

4. In a spring suspension for vehicles, the combination with the vehicle frame and the vehicle axle, of a collapsible frame comprising lower links pivoted at their inner ends to a part moving up and down with the vehicle axle, swinging links connecting the outer ends of said lower links to the vehicle frame, a substantially horizontal member movable towards and away from the vehicle axle, upper links connecting said member to the lower links at points between the ends of the latter links, and helical compression springs interposed between said member and said lower links.

5. In a spring suspension for vehicles, the combination with the vehicle frame and the casing of the vehicle live axle, of a bracket suspended from the axle casing, and a collapsible frame comprising links connected at their outer ends to the vehicle frame and at their inner ends to said bracket at a point beneath the axle casing, a substantially horizontal member movable towards and away from the vehicle axle, links connecting said member to the former links at points between their ends, and springs interposed between said member and said former links.

6. In a spring suspension for vehicles, the combination with the vehicle frame and the casing of the vehicle live axle, of a bracket suspended from the axle casing, and a collapsible frame comprising lower links pivoted at their inner ends to said bracket at a point beneath the axle casing, swinging links connecting the outer ends of said lower links to the vehicle frame, a substantially horizontal member movable towards and away from the vehicle axle, upper links connecting said member to the lower links at points between the ends of the latter links, and springs interposed between said member and said lower links.

ALBERT VINCENT BOOTHROYD.